US006299714B1

(12) United States Patent
Takizawa et al.

(10) Patent No.: US 6,299,714 B1
(45) Date of Patent: *Oct. 9, 2001

(54) SEALANT APPLICATION METHOD

(75) Inventors: Toshiki Takizawa, Tachikawa; Shinji Saito, Kodaira, both of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,289

(22) Filed: Jun. 29, 1998

(30) Foreign Application Priority Data

Jun. 30, 1997 (JP) .................................................. 9-189252

(51) Int. Cl.⁷ ...................................................... B32B 31/24
(52) U.S. Cl. ........................... 156/71; 156/94; 156/272.6; 156/273.3
(58) Field of Search .................... 156/272.6, 71, 156/94, 98, 272.2, 273.3, 275.7; 52/741.4, 741.41

(56) References Cited

U.S. PATENT DOCUMENTS

| 4,151,696 | * | 5/1979 | Knights et al. .................... 52/741.41 |
| 4,312,693 | | 1/1982 | Salensky et al. ..................... 156/272 |
| 4,499,148 | * | 2/1985 | Goodale et al. ...................... 428/447 |
| 5,472,544 | * | 12/1995 | Fukamachi et al. ................. 156/250 |
| 5,484,654 | | 1/1996 | Mueller ................................ 428/332 |
| 5,702,772 | * | 12/1997 | Skelly et al. ......................... 427/536 |
| 5,879,757 | * | 3/1999 | Gutowski et al. ................... 427/491 |
| 5,922,161 | * | 7/1999 | Wu et al. ........................... 156/272.6 |

FOREIGN PATENT DOCUMENTS

| 0 624 464 A1 | 11/1994 | (EP) . |
| 10-25822 | 1/1998 | (JP) . |
| A 10-61038 | 3/1998 | (JP) . |

OTHER PUBLICATIONS

Kaplan, Stephen L., Robert Holland. Gas Plasma Technology and Its Applications. Plasma Science pp. 3–5, 8, 1987.*
Database WPI, Sec. PQ, Week 9628/, Derwent Pub., Ltd., London, GB; Cl. Q43, AN 96–273108–XP002078170 & JP 08 113988 A (Ishika Wajima Kenzai Kogyo KK), May 7, 1996—Abstract.
Database WPI, Sec. Ch, Week 9227, Derwent Pub., Ltd., London, GB; Cl. A14, AN 92–222300 XP002078658 & JP 04 146132 A (Nippon Carbide Kogyo KK), May 20, 1992—Abstract.
Database WPI, Sec. Ch, Week 8415, Derwent Pub., Ltd., London, GB; Cl. A17, An 84–091660 XP002078171 & JP 59 38269 A (Sumitomo Chem. Co., Ltd) Mar. 2, 1984—Abstract.
Database WPI, Sec. Ch, Week 9041, Derwent Pub., Ltd., London, GB: Cl. A88, AN 90–308686 XP002078172 & JP 02 217684 (Nitto Denko Corp), Aug. 30, 1990, Abstract.
Database WPI, Sec. Ch, Week 8138 Derwent Pub., Ltd., London, GB; Cl. A26, AN–68689D XP002078173 & JP 56 095976 A (Toray Silicone Co. Ltd.), Aug. 3, 1981, Abstract.
Database WPI, Sec. Ch, Week 9403, Derwent Pub., Ltd., London, GB; Cl. A25, AN 94–018661 XP002078174 & JP 05 320621 A (Sekisui Chem Ind. Co. Ltd.), Dec. 3, 1993, Abstract.

* cited by examiner

*Primary Examiner*—Jeff H. Aftergut
*Assistant Examiner*—Gladys Piazza
(74) *Attorney, Agent, or Firm*—Sughrue, Mion, Zinn, Macpeak & Seas, PLLC

(57) ABSTRACT

A sealant application method for applying a first sealant as a preliminary sealant to a second sealant as a subsequent sealant, comprising the steps of subjecting a surface of the first sealant to an electric discharge treatment; and applying the second sealant directly to or through a primer to the first sealant after the electric discharge treatment. The first sealant preliminarily applied is first subjected to the electric discharge treatment to thereby reform the surface of the first sealant into an optimum-condition, thereby ensuring strong adhesion of the second sealant to the first sealant.

2 Claims, 1 Drawing Sheet

SEALANT APPLICATION METHOD

BACKGROUND OF THE INVENTION

1. Field of the Invention

The present invention relates to a sealant application method wherein in the case of preliminarily applying a first sealant and next applying a second sealant to the first sealant, the adhesiveness of the second sealant to the first sealant is improved.

2. Description of the Related Art

Conventionally, application of a sealant is known to give water-tightness and air-tightness to a building or the like.

Examples of such a sealant widely used at present include a silicone sealant, MS sealant (alkoxy silicone functionalized polyoxypropylene polymer base sealant), polysulfide sealant, polyurethane sealant, acrylic urethane sealant, and acrylic sealant. A proper kind of sealant for a proper place of application is selected according to the performance of the sealants, and several kinds of the sealants are always used.

For example, in the case of a silicone sealant, it is widely used for the surrounding of a windowpane or the like owing to its excellence of weather resistance and durability. However, the outer periphery of a joint is largely contaminated with the sealant, so that actual use of the sealant is largely limited.

In the case of a modified silicone sealant, it cannot be used for the surrounding of a windowpane which requires weather resistance.

In the case of a polysulfide sealant, it is inferior to a modified silicone sealant and a silicone sealant in responsiveness to movement of a joint, so that it cannot be used for a joint of a metal curtain wall with large movement.

Thus, a proper sealant is used for a proper place according to the structure, material, etc. of a building. Accordingly, different sealants are applied to carry out successive jointing, causing a problem in adhesion.

Such application of different sealants in succession is called successive jointing of sealants. The problem in adhesion due to the successive jointing frequently arises at an actual sealant application site.

Further, in sealant modification work, a refilling process is generally carried out in such a manner that an old sealant before modification is first removed and a new sealant is therefore filled. Also in this case, there is a problem in adhesion between the old sealant and the new sealant.

In such successive jointing of sealants, the adhesion between the sealants may become insufficient depending on the kinds of sealants, and it is therefore important to check the adhering condition at the joint.

That is, in the case of preliminarily applying a first sealant and thereafter applying a second sealant to the first sealant, a technique for improving the adhesion of the second sealant to the first sealant is required.

In the case where the first sealant is a silicone sealant, there is a difficulty in adhesion in respect of the combination of the first and second sealants used in successive jointing or modification as described in Sealant Handbook (issued by Japan Sealant Industry Association) p31 and p151. That is, in the case that the first sealant preliminarily applied is a silicone sealant, only a silicone sealant that can adhere to the first sealant is usable as the second sealant to be next applied, and the other sealants including a modified silicone sealant, polysulfide sealant, polyurethane sealant, acrylic urethane sealant, and acrylic sealant cannot adhere to the first sealant.

Further, in the case that the first sealant is a modified silicone sealant, adhesion of a polysulfide sealant, polyurethane sealant, and acrylic urethane sealant to the first sealant is difficult.

Accordingly, it has been desired to develop a sealant application method allowing good adhesion of the second sealant to the first sealant irrespective of the kind of the first sealant.

SUMMARY OF THE INVENTION

It is accordingly an object of the present invention to provide a sealant application method which can achieve strong adhesion of the first sealant preliminarily applied and the second sealant to be next applied to the first sealant with less time and labor.

From a detailed study for achievement of the above object, the present inventors have found out the fact that good adhesion of the first sealant (preliminary sealant) to the second sealant (subsequent sealant) can be obtained by subjecting an adhering portion of the first sealant to a given electric discharge treatment, so that the first and second sealants can reliably adhere to each other.

More specifically, by subjecting the surface of the first sealant to an electric discharge treatment such as corona treatment, plasma treatment, blow treatment by corona discharge or arc discharge in a gas flow, and plasma torch treatment, the surface of the first sealant can be reformed into an optimum condition, thereby remarkably improving wettability and reactivity (adhesiveness) of the surface of the first sealant to result in great improvement of adhesion of the first sealant to the second sealant.

Even when the first sealant is a silicone sealant or a modified silicone sealant, causing an outstanding problem in the prior art, reliable adhesion of the second sealant can be achieved to allow excellent successive jointing by adopting the method of the present invention. Thus, the present invention has been accomplished from the conclusion that the above method is an optimum sealant application method.

According to the present invention, the following sealant application method is provided.

A first sealant application method for applying a first sealant as a preliminary sealant to a second sealant as a subsequent sealant, comprising the steps of subjecting a surface of said first sealant to an electric discharge treatment; and applying said second sealant directly to or through a primer to said first sealant after said electric discharge treatment.

A sealant application method according to the first sealing method above wherein each of said first and second sealants is selected from the group consisting of a silicone sealant, modified silicone sealant, polysulfide sealant, polyurethane sealant, and acrylic urethane sealant.

A sealant application method according to the first sealing method above wherein said electric discharge treatment is a corona treatment or plasma treatment.

A sealant application method according to the first sealing method above wherein said electric discharge treatment is a blow treatment by corona discharge or arc discharge blown in a gas flow.

A sealant application method according to the first sealing method above wherein said electric discharge treatment is a plasma torch treatment by plasma discharge blown in a gas flow.

DETAILED DESCRIPTION OF THE PREFERRED EMBODIMENTS

Figure 1:
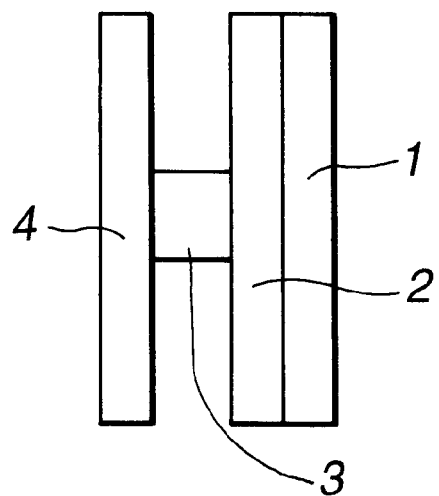
FIG. 1 is a sectional view of an adhesion test sample.

The present invention will now be described in more detail. According to the sealant application method of the present invention, the first sealant is first subjected to a given electric discharge treatment, and the second sealant is next applied directly to or preferably through a primer to the first sealant.

The materials of the first and second sealants are not especially limited, but include a silicone sealant, modified silicone sealant, polysulfide sealant, polyurethane sealant, acrylic urethane sealant.

Preferable examples of the electric discharge treatment in the present invention include a corona treatment, plasma treatment, blow treatment by corona discharge or arc discharge blown in a gas flow, and plasma torch treatment. By using any one of these treatments, the excellent effect of the present invention can be exhibited. That is, by subjecting the surface of the first sealant to the above electric discharge treatment, the surface of the first sealant can be reformed into an optimum condition, thereby remarkably improving wettability and reactivity (adhesiveness) of the surface of the first sealant, so that the bonding strength between the first sealant and the primer or the second sealant can be remarkably improved.

Usually, sealant application is carried out at a building site, so from the viewpoints of simplicity of the treatment and portability of a treating device, the corona treatment or the blow treatment by corona discharge blown in a gas flow is more preferable.

The corona treatment may be realized by an electric discharge treatment including the steps of generating an electric discharge between first and second electrodes opposed to each other at a high-frequency high voltage, and passing the sealant through the discharge space. In the case where the sealant is bonded to a metal panel and the sealant has a small thickness, the sealant itself may be used as the second electrode to generate an electric discharge between the first electrode and the sealant/metal panel, thereby reforming the surface of the sealant. In this case, the electric discharge treatment is carried out usually with an output of 10 to 1000 W for about 0.1 to 30 seconds.

The plasma treatment may be realized by an electric discharge treatment using ions, electrons, radicals, photons, atoms, molecules, etc. in a plasma to reform the surface of the sealant, which treatment includes the steps of generating an electric discharge by applying a dc or ac electric field to a gas at a given pressure (low pressure or atmospheric pressure), and placing the sealant in the electric discharge or downstream of the electric discharge in respect of a gas flow. In this case, the electric discharge treatment is carried out usually under a gas pressure of 0.001 to 1000 Torr and a frequency of the electric field for plasma such as a dc, constant-frequency ac of 50 Hz, ac of about 1 to 100 kHz, radio wave of 13.56 MHz, or microwave of 2.45 GHz. Examples of the gas include argon (Ar), oxygen, air, nitrogen, helium (He), and $CF_4$.

The blow treatment by corona discharge or arc discharge blown in a gas flow may be realized by an electric discharge treatment including the steps of generating a corona discharge or arc discharge between electrodes, blowing the discharge with a gas flow such as air flow, and subjecting the sealant to the downstream blown discharge in respect of the gas flow. In this case, the electric discharge treatment is carried out usually with a distance of 1 to 100 mm between a discharge outlet port and a treatment surface of the sealant for about 1 to 30 seconds.

The plasma torch treatment may be realized by an electric discharge treatment including the steps of generating a plasma discharge at an atmospheric pressure or the like, blowing the discharge with a gas, and subjecting the sealant to the downstream blown discharge. In this case, the electric discharge treatment is carried out usually by using helium, argon, or the like as the gas at a gas pressure of 500 to 2000 Torr at a frequency of 50 Hz to 100 MHz for about 1 to 30 seconds.

In the sealant application method of the present invention, a primer is preferably applied to the first sealant after the above electric discharge treatment. However, the second sealant may be applied directly to the first sealant without using the primer.

The primer used in the present invention is a substrate treating material to be preliminarily applied to the first sealant before applying the second sealant to the first sealant, so as to improve the adhesiveness between the first and second sealants. The material of the primer is not especially limited in the present invention, but various materials known in the art may be used. Examples of the primer include synthetic rubber, acrylic, urethane, epoxy, and silane primers in which a silane coupling agent, polyiscyanate, epoxy resin, synthetic rubber, acrylic resin, etc. are compounded. In the present invention, the adhesiveness between the first sealant and the primer can also be improved by the above electric discharge treatment, thereby ensuring strong adhesion of the first sealant and the second sealant.

The primer is applied to the first sealant by using a brush or the like and thereafter air-dried. Thereafter, the second sealant is applied to the primer.

Thus, the sealant application method of the present invention can exhibit an effect that the second sealant can be firmly bonded to the first sealant by the electric discharge treatment of the first sealant.

In the following, the present invention is illustrated by means of examples in connection with comparisons. It is to be noted that the present invention is not limited to the examples.

EXAMPLE

Various preliminary sealants (Petam MS1000, one-part modified silicone sealant; Petam MS2000, two-part modified silicone sealant; Petam SR1100, one-part silicone sealant; and Petam SR2000, two-part silicone sealant, all manufactured by Bridgestone Corp.) were applied with a thickness of 3 mm to alumite sample panels each having a size of 50 mm×50 mm ×3 mm as shown in FIG. 1. Thereafter, the sealants were allowed to stand for curing at room temperature for one month. Thereafter, the sealants were subjected to various electric discharge treatments under the following conditions (Examples A to D). Comparison E is a reference in which no electric discharge treatment was carried out.

(A) Corona treatment
   Output: 300 W
   Treatment time: 5 seconds
   Treating device: HV05-2 manufactured by TANTEC Co., Ltd.

(B) Plasma treatment
   Pressure: 1 Torr
   Gas used: Ar gas
   Output: 100 W
   Treatment time: 30 seconds
   Treating device: Asher PC101A manufactured by Yamato Scientific Co.,Ltd.

(C) Blow corona treatment
   Distance: 40 mm
   Treatment time: 4 seconds
   Treating device: Plasma treater manufactured by Arbrant Co.,Ltd.

(D) Plasma torch treatment

Pressure: 760 Torr
Gas used: He gas
Frequency: 13.56 MHz
Output: 100 W
Treatment time: 5 seconds
(E) Untreated Thereafter, a primer (Petam Primer No. 3 manufactured by Bridgestone Corp.) was applied to the preliminary sealants, and various subsequent sealants (Petam MS2000, two-part modified silicone sealant; Petam PS2000, two-part polysulfide sealant; and Petam PU2000, two-part polyurethane sealant, all manufactured by Bridgestone Corp.) were then applied through the primer to the preliminary sealants, thus preparing H-type samples in accordance with JIS A5758. These samples were allowed to stand for precuring at 20° C. at 55% in RH for one week, and then stand for postcuring at 50° C. for one week.

The samples obtained were subjected to an adhesion test in accordance with JIS A5758. The results are shown in Table 1.

In FIG. 1, reference numerals 1, 2, 3, and 4 denote the alumite sample panel, preliminary sealant, subsequent sealant, and alumite (aluminum alloy anodized in a sulfuric acid), respectively.

TABLE 1

| | Preliminary Sealant | | Subsequent Sealant | | |
|---|---|---|---|---|---|
| | | | Petam MS2000 | Petam PS2000 | Petam PU2000 |
| | Kind | Treatment | Bonding Strength (N/cm$^2$) | | |
| Comparison 1 | Petam | Untreated (E) | 31.4 | 18.4 | 38.4 |
| Example 1 | MS1000 | A | 37.4 | 27.9 | 44.5 |
| Example 2 | | B | 37.7 | 28.4 | 43.5 |
| Example 3 | | C | 38.5 | 27.7 | 44.6 |
| Example 4 | | D | 36.9 | 28.8 | 45.6 |
| Comparison 2 | Petam | Untreated (E) | 28.4 | 19.5 | 36.4 |
| Example 5 | MS2000 | A | 35.4 | 26.8 | 43.3 |
| Example 6 | | B | 34.7 | 26.7 | 42.5 |
| Example 7 | | C | 35.5 | 28.1 | 43.1 |
| Example 8 | | D | 33.0 | 27.7 | 43.9 |
| Comparison 3 | Petam | Untreated (E) | 10.6 | 3.1 | 22.3 |
| Example 9 | SR1100 | A | 37.6 | 37.3 | 41.1 |
| Example 10 | | B | 36.4 | 34.6 | 42.3 |
| Example 11 | | C | 35.4 | 35.8 | 44.6 |
| Exampie 12 | | D | 33.5 | 36.4 | 45.7 |
| Comparison 4 | Petam | Untreated (E) | 11.5 | 3.0 | 25.9 |
| Example 13 | SR2000 | A | 39.4 | 38.2 | 53.8 |
| Example 14 | | B | 37.4 | 33.5 | 51.9 |
| Example 15 | | C | 34.9 | 35.6 | 54.3 |
| Example 16 | | D | 33.7 | 36.4 | 53.0 |

As apparent from Table 1, the bonding strength between the preliminary sealant and the subsequent sealant is remarkably improved by the electric discharge treatment of the preliminary sealant, thereby improving successive jointing of the subsequent sealant.

What is claimed is:

1. A sealant application method for applying a first sealant as a preliminary sealant to a second sealant as a subsequent sealant, wherein each of said first and second sealants is selected from the group consisting of a silicone sealant, MS (modified silicone) sealant, polysulfide sealant, polyurethane sealant, and acrylic urethane sealant, comprising the steps of:

subjecting a surface of said first sealant on a building to an electric discharge treatment; and applying said second sealant directly to or through a primer to said first sealant after said electric discharge treatment, wherein said electric discharge treatment comprises a corona treatment a blow treatment by corona discharge or arc discharge blown in a gas flow.

2. A sealant application method according to claim 1, wherein said first and second sealants is selected from the following combinations (a)–(g), (a) the first sealant is modified silicone sealant and the second sealant is polysulfide sealant, (b) the first sealant is modified silicone sealant and the second sealant is polyurethane sealant, (c) the first sealant is silicone sealant and the second sealant is modified silicone sealant, (d) the first sealant is silicone sealant and the second sealant is polysulfide sealant, (e) the first sealant is silicone sealant and the second sealant is polyurethane sealant, (f) the first sealant is silicone sealant and the second sealant is silicone sealant, and (g) the first sealant is modified silicone sealant and the second sealant is modified silicone sealant.

* * * * *